United States Patent [19]
Yates

[11] Patent Number: 6,089,516
[45] Date of Patent: Jul. 18, 2000

[54] DECORATIVE CUSHION PROVIDING WIDE LATERAL MOVEMENT SUPPORT

[76] Inventor: Paul M. Yates, 5814 Briar Tree Dr., LaCanada, Calif. 91011

[21] Appl. No.: 09/210,004

[22] Filed: Dec. 11, 1998

[51] Int. Cl.[7] .............................. B68G 5/00; B43L 15/00; A47B 91/00; A47G 29/00; B65D 19/00

[52] U.S. Cl. ................ 248/118; 248/118.1; 248/346.01; 248/918

[58] Field of Search ................. 248/118, 118.1, 248/118.3, 118.5, 346.01, 918

[56] References Cited

U.S. PATENT DOCUMENTS

| | | | |
|---|---|---|---|
| 4,550,894 | 11/1985 | Barlics | 248/346.01 |
| 5,161,760 | 11/1992 | Terback | 248/118 |
| 5,679,193 | 10/1997 | Yates | 156/145 |
| 5,696,536 | 12/1997 | Murphy | 248/346.01 |
| 5,713,544 | 2/1998 | Wolf et al. | 248/118 |
| 5,727,766 | 3/1998 | Mayo | 248/346.01 |
| 5,756,184 | 5/1998 | Yates | 428/188 |
| 5,791,620 | 8/1998 | Carcich, Jr. | 248/346.01 |
| 5,918,839 | 7/1995 | DuBois | 248/118 |
| 5,942,311 | 7/1997 | Scianna | 248/346.01 |
| 5,948,520 | 7/1997 | Hirsch | 248/118 |
| 5,952,070 | 7/1997 | Depiero | 248/346.01 |
| 6,016,138 | 10/1997 | Harskamp et al. | 248/118 |

*Primary Examiner*—Ramon O. Ramirez
*Attorney, Agent, or Firm*—Walter A. Hackler

[57] ABSTRACT

A cushion includes a transparent elastomer having a bottom and a congruent rounded top. A transparent film is provided for encapsulating the transparent elastomer and providing a rounded perimeter on the transparent elastomer. An opaque backing, if adhered to the elastomer flat back, has a decorative pattern thereon visible through the transparent film and the transparent elastomer rounded top. A plurality of depressions in the elastomer enable wide lateral movement, and at the same time provide a decorative enhancement of the pattern through the transparent elastomer.

33 Claims, 1 Drawing Sheet

DECORATIVE CUSHION PROVIDING WIDE LATERAL MOVEMENT SUPPORT

The present invention generally relates to cushions and is more particularly directed to cushions for supporting a user's body while at the same time enabling a wide range of lateral movement across the cushion without slippage therebetween.

Such cushions are particularly useful as wrist supports in front of a computer keyboard, computer mouse or other devices requiring manual operation.

Proper support is necessary, particularly in conjunction with repetitive computer keyboards and, as is well known, a number of medical problems can arise which is generally known in the art as "carpal tunnel syndrome".

The present invention is directed to a decorative cushion which provides wide lateral movement support and accordingly is suitable for use as a rest cushion.

SUMMARY OF THE INVENTION

A cushion in accordance with the present invention generally includes a transparent elastomer having a bottom and a congruent top along with a transparent film which provides a means for encapsulating the transparent elastomer and providing a rounded perimeter on the transparent elastomer. Encapsulation of the elastomer is preferred in order to prevent any possible seepage of plasticizer oils commonly utilized in such elastomers. Preferably the film is urethane and has a, thickener of between about 1 mil and about 5 mil.

An opaque backing may be provided and adhered to the elastomer bottom. A decorative pattern disposed on the opaque backing is visible through the transparent film means and the transparent elastomer top.

Importantly, crater means, formed in at least a portion of the elastomer top, is provided for enhancing the visual appearance of the decorative pattern visible through the transparent film and the transparent elastomer rounded top. The crater means may comprise a plurality of adjacent depressions having optical surfaces therein.

Such optical surfaces include hemispherical surfaces and conical surfaces which may be arranged and fashioned to provide a changing visual image of the decorative pattern on the opaque backing depending upon the compression of the transparent elastomer as well as the angle of viewing of the decorative pattern through the transparent elastomer and covering film.

Importantly, the depth of adjacent depressions enables enhanced cushioned lateral movement of the top portion. When the transparent elastomer has a thickness of between about one-half inch and about three inches, the adjacent depressions are of sufficient depth to enable movement of the supported object up to about one inch without slipping of surface contact between the rounded top portion and the supported object. A sufficient depth may be, for example, about one-half inch.

This lateral movement produces an animated effect of the visual image. A sense of motion between the depressions and the decorative patterns can be achieved by wrist motion of the user.

Further, the film may include means which define a color variation in the film for further altering a visual appearance of the decorative pattern visible through the transparent film and the transparent elastomer top. More particularly, the color variations may be aligned with the plurality of depressions or, alternatively, aligned with the rounded top portions disposed between the plurality of depressions.

To further characterize the cushion, the crater means may comprise a plurality of identifiable figures on the rounded top portion between the plurality of depressions. These identifiable figures may be any suitable figures of various motifs, including, for example, pets, fish, etc. In this instance, the film may include means defining a color variation which are aligned with the plurality of identifiable figures.

This can provide for a wide variety of visual effects. For example, with an opaque backing of an aquarium type setting, the identifiable figures on the rounded top portion of the cushion may be fish, which accordingly appear to move about as the user uses the cushion. Other objects may be suspended within the elastomer in order to enhance the aquarium effect.

In addition, the opaque backing may be light reflective in order to provide a means for back illuminating the identifiable figures, thus also causing a "suspended" appearance.

For example, a user's wrists which are in contact with rounded top portions of the cushions during entering data may be shifted or laterally displaced which causes visual effect of, again, for example, an agitated school of fish. This visual display, in combination with the provided lateral displacement enabled by the structure of the present invention, provides a dual incentive for typists and the like to purchase the decorative cushion in accordance with the present invention which provides a wide lateral wrist movement support and an animated display.

Alternatively, in one embodiment of the invention, the opaque backing may be omitted and the design characteristics hereinabove noted provide a change in visual appearance of any support surface for the cushion.

BRIEF DESCRIPTION OF THE DRAWINGS

The present invention may be more clearly understood with reference to the following detailed description in conjunction with the appended drawings of which.

DETAILED DESCRIPTION

Figure 1:
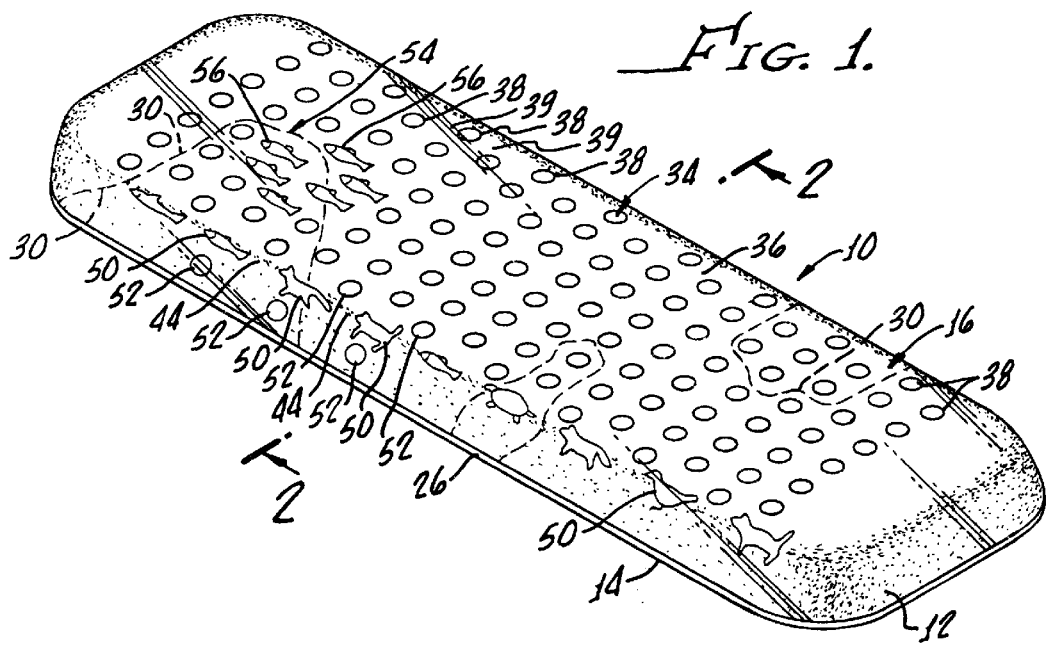
FIG. 1 is a perspective view of a cushion in accordance with the present invention generally showing a transparent elastomer with an encapsulating transparent film along with a plurality of adjacent depressions which provide a crater means for enhancing a visual appearance of a surface disposed below the cushion.

With reference to FIG. 1, there is shown a cushion 10 in accordance with the present invention, which includes a transparent elastomer 12, which may have a bottom, or flat back, 14 and a congruent top 16. As hereinafter noted, the top may be rounded in order to provide additional features.

The elastomer 12 may be of any suitable type such as, for example, a stable elastomeric block polymer gel similar to the gel described in U.S. Pat. No. 3,676,387. This patent is incorporated herewith in its entirety for the purpose of describing a suitable type of gels for the present invention. Generally, the gels are polymer-oil combinations. Specifically, the elastomer 12 has the physical properties of flexibility and compressibility in the range of flexibilities and compressibilities of stable elastomer block polymer gels such as set forth in U.S. Pat. No. 3,676,387.

Figure 2:
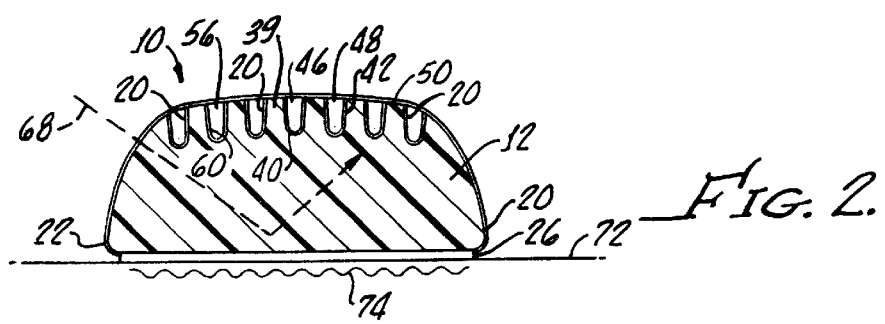
FIG. 2 is a cross sectional view of the cushion taken along the line 2—2 of FIG. 1 generally showing a plurality of adjacent depressions having optical surfaces thereon along with an opaque backing having a decorative pattern thereon adhered to a back of the elastomer.

As more clearly shown in FIG. 2, a transparent film, for example, a urethane, polyurethane, or urethane-like film 20, is provided for encapsulating the transparent elastomer and providing a rounded perimeter 22 on the transparent elastomer 12.

Importantly, a film 20 thickness of urethane, or polyurethane, of between about 1 mil and about 5 mil, has been found to be sufficient for encapsulating the elastomer 12, yet having a resiliency enabling free gel-like movement, or depression of the elastomer 12, by a user. That is, the film 20 has physical properties of flexibility to enable uninhibited flexure and compression of the elastomer 12 by a user. Film 20 thickness beyond this range has not been found to be effective in maintaining the gel-like property of the elastomer while providing encapsulation and the elimination of any edge between the elastomer top 16 and back 14.

In one embodiment of the present invention, an opaque backing 26 is adhered to the bottom or back of the cushion 10 which includes a decorative pattern 30 shown in dashed line in FIG. 1, which is visible through the transparent film 20 and the transparent elastomer top 16.

Crater means 34 formed in at least a portion of the elastomer rounded top 16 are provided for enhancing a visual appearance of decorative pattern 30 visible through the transparent film 20 and the transparent elastomer 12.

More particularly, the crater means 34 may comprise a plurality of adjacent depressions 38 and projections 39. The depressions may have optical surfaces 40, 42, therein. See FIG. 2.

The optical surface 40 may have a hemispherical shape, while the optical surface 42 may have a conical shape. In addition, to further enhance lateral motion, as hereinafter described, of the rounded top 16, the film 20 preferably follows the contour of the depressions 46, 48 having hemispherical surfaces 40, conical surfaces 42, respectively.

The process of forming the cushion 10 is through a process set forth in U.S. Pat. No. 5,679,193, entitled, METHOD OF MANUFACTURING A GEL CUSHION, U.S. Pat. No. 5,756,184 entitled, GEL CUSHION, and in U.S. patent application Ser. No. 08/856,744 filed May 15, 1997, entitled, CUSHION MANUFACTURING METHOD. Both these referenced patents and application are incorporated herewith in their entirety by this reference thereto, or illustrating the manner in which a gel cushion in accordance with the present invention may be manufactured.

The various surfaces 40, 42 in the depressions 46, 48 vary the perceived image of the decorative pattern 30 on the backing 26. Preferably, the backing 26 is flexible so that the entire cushion 10 may be conformed to any surface. This flexure also provides a further enhancement of the image viewed through the film 20 and the elastomer 12.

To further enhance the visual effect of the cushion 10, a plurality of projections 44 identifiable FIGS. 50 shown individually along the rounded top 16 of the cushion 10 and outlined by depressions 52 may be provided. That is, the depressions 52 form a perimeter of the FIG. 50 which are projections 44 between the depressions 52.

As a specific example, a school 54 of fish-like FIGS. 56 may be utilized to form an interesting display array, particularly when the decorative pattern 30 disposed on the backing 26 is in the configuration of an aquarium or lagoon bottom.

It should be appreciated that movement of the elastomer causes a swimming-like effect of the fish 56 over the background 30. This configuration is particularly effective in the context of an aquarium motif for the cushion 10. To further enhance the decorative effect of the present invention, the film 20 may include color variations which is particularly striking when the color variations occur in a portion of the film 60 conforming to a fish depression 56. See FIG. 2. Thus, if the transparent gel 12 is provided with a blue coloring, separately colored fish depressions 56 appear to be moving along a reef pattern 30.

Additionally, the opaque backing 26 may be light reflective, for example, aluminized mylar, in order to provide a means for back illuminating the identifiable figures, see dashed arrow 68 in FIG. 2 representing reflected light. Alternatively, in order to create different lighting patterns, a reflective layer, or semi-reflective layer, 70 may be used, a dashed arrow 72 showing a reflected pattern. The semi-reflective layer may be, in fact, a company logo or advertisement.

Figure 3:
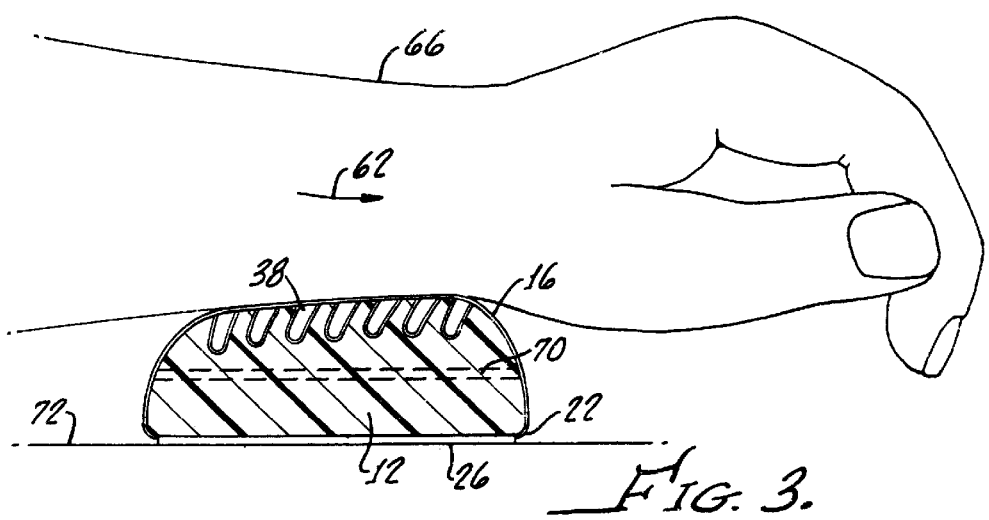
FIG. 3 is a cross sectional view similar to that shown in FIG. 2 showing the lateral motion enabled by the plurality of depressions.

Further, the elastomer 12 may include one or more color variations, indicated as dashed line 74 in FIG. 3, which provides further means for altering a visual appearance of the elastomer 12.

Yet, another feature of the cushion 10 is provided by the rounded top 16 in that the curvature enables magnification of the decorative pattern 30 which can be varied by depressing the elastomer 12 as shown in FIG. 3, thus the elastomer enables a change in magnification by a manual change in contour thereof.

Another important feature of the present invention is provided by the depressions 38 and projection 39. More particularly, the depth of adjacent depressions 38 enables enhanced cushioned lateral movement in the direction of the arrow 62 shown in FIG. 3. With a depression 38 spacing of less than about ½ inch, an elastomer 12 thickness of between about one-half inch and about three inches and a depression 38 depth of between about one inch and about one inch lateral movement, shown by the arrow 62 of a supported object such as, a wrist 66, of up to about one inch without the slipping of surface contact between the rounded top 16 and the wrist 66, is possible.

Thus, a firm support is afforded the wrist, while at the same time a movement for operation of a keyboard or a mouse is enabled without shifting or sliding the wrist across the cushion top 16. In this manner the rounded surface 16 conforms to the supported wrist 66 in order to distribute the weight of the wrist over a wide area, while at the same time affording significant movement of the rounded top 16 with the supported wrist relative to the backing 26 or surface 76, see FIG. 2.

It should be appreciated that if the backing 26 is not utilized, a pattern 78 in a surface 80 is visible through the film 20 and the elastomer 12, which is enhanced as hereinabove set forth in connection with the description of the crater means 34, including the depressions 38 of various FIGS. 50, 56.

Because wide lateral motion is afforded by the cushion 10 in accordance with the present invention, movement of adjacent depressions, such as, for example, fish depressions 56, may be provided within an oscillating motion.

Although there has been hereinabove described a gel cushion in accordance with the present invention, for the purpose of illustrating the manner in which the invention may be used to advantage, it will be appreciated that the invention is not limited thereto. Accordingly, any and all modifications, variations or equivalent arrangements which may occur to those skilled in the art, should be considered to be within the scope of the invention as defined in the appended claims.

What is claimed is:

1. A cushion comprising:

a transparent elastomer, having a bottom and a congruent top;

transparent film means for both encapsulating said transparent elastomer and providing a smooth perimeter on said transparent elastomer between the top and bottom;

an opaque backing adhered to the elastomer bottom and having a decorative pattern thereon visible through said transparent film means and the transparent elastomer top;

crater means, formed in at least a portion of the elastomer top, for enhancing a visual appearance of the decorative pattern visible through said transparent film and the transparent elastomer rounded top.

2. The cushion according to claim 1 wherein said crater means comprises a plurality of adjacent projections and depressions having optical surfaces therein.

3. The cushion according to claim 2 wherein said optical surfaces are hemispherical.

4. The cushion according to claim 2 wherein said optical surfaces are conical.

5. The cushion according to claim 2 further comprising means, defining a depression depth, for enabling enhanced cushioned lateral movement of the portion of said top.

6. The cushion according to claim 5 wherein said transparent elastomer has a thickness of between about one-half inch and about three inches and said depressions are of sufficient depth to enable lateral movement of a supported object of up to about one inch without slipping of surface contact between the rounded top portion and said supported object.

7. The cushion according to claim 6 wherein said depressions have a depth of up to about one-half inch.

8. The cushion according to claim 2 wherein said projections comprise a plurality of identifiable figures outlined by the plurality of depressions.

9. The cushion according to claim 8 wherein said film means includes means, defining color variation in said film means, for altering the enhanced usual appearance of the decorative pattern visible through said transparent film and the transparent elastomer rounded top.

10. The cushion according to claim 9 wherein the color variations are aligned with the plurality of identifiable figures.

11. The cushion according to claim 1 wherein said transparent film means comprises a urethane-like film of between about 1 mil and about 5 mil thickness.

12. The cushion according to claim 1 wherein said film means includes means, defining color variation in said film means, for altering the enhanced visual appearance of the decorative pattern visible through said transparent film and the transparent elastomer top.

13. The cushion according to claim 12 wherein the color variations are aligned with the plurality of depressions.

14. The cushion according to claim 12 wherein the color variations are aligned with top portion disposed between the plurality of depressions.

15. The cushion according to claim 14 wherein said transparent elastomer includes means, defining color variations therein, for altering a visual appearance of said transparent elastomer.

16. The cushion according to claim 15 further comprising means, defining a rounded elastomer top, for magnifying the decorative pattern, the resiliency of the elastomer enabling a change in magnification by change of contour of the elastomer rounded top and thickness of the elastomer as a result of depressing the elastomer.

17. A wrist cushion comprising:

a transparent elastomer having a rounded top and a bottom surface;

transparent film means for encapsulating said transparent elastomer; and crater means, formed in at least a portion of then elastomer rounded surface, for enhancing a visual appearance through said transparent film and the transparent elastomer rounded surface.

18. The cushion according to claim 17 wherein said crater means comprises a plurality of adjacent projections and depressions having optical surfaces therein.

19. The cushion according to claim 18 wherein said optical surfaces are hemispherical.

20. The cushion according to claim 18 wherein said optical surfaces are conical.

21. The cushion according to claim 18 further comprising means, defining a depression depth, for enabling enhanced cushioned lateral movement of the portion of said top.

22. The cushion according to claim 21 wherein said transparent elastomer has a thickness of between about one-half inch and about three inches and said depressions are of sufficient depth to enable lateral movement of a supported object of up to about one inch without slipping of surface contact between the rounded top portion and said supported object.

23. The cushion according to claim 18 wherein said projections comprise a plurality of identifiable figures outlined by the plurality of depressions.

24. The cushion according to claim 23 further comprising means for back illumination of the identifiable figures.

25. The cushion according to claim 24 wherein the means for back illumination comprises a light reflecting backing adhered to the bottom surface.

26. The cushion according to claim 24 wherein the means for back illumination comprises a light reflecting layer suspended within the elastomer.

27. The cushion according to claim 23 wherein said film means includes means, defining color variations in said film means, for altering the enhanced usual appearance of the decorative pattern visible through said transparent film and the transparent elastomer rounded top.

28. The cushion according to claim 27 wherein the color variations are aligned with the plurality of identifiable figures.

29. The cushion according to claim 18 further comprising identifiable objects suspended in said transparent elastomer and visible through the transparent elastomer and transparent film.

30. The cushion according to claim 18 further comprising a design layer suspended in said transparent elastomer and visible through the transparent elastomer and transparent film.

31. A cushion comprising:

a molded elastomer having a back, a rounded top and means, defining a crater surface on at least a portion of said rounded top, for enabling enhanced cushioned lateral movement of the portion of said rounded top;

film means for encapsulating said molded elastomer, said film means adhering to said rounded top and conforming to said crater surface.

32. The cushion according to claim 31 wherein said molded elastomer has a thickness of between about one-half inch and about three inches and said crater surface includes adjacent depressions of sufficient depth to enable lateral movement of a supported object of up to about one inch without slipping of surface contact between said crater surface and said supported object.

33. The cushion according to claim 32 wherein said adjacent depressions have a depth of up to about one-half inch.

* * * * *